UNITED STATES PATENT OFFICE.

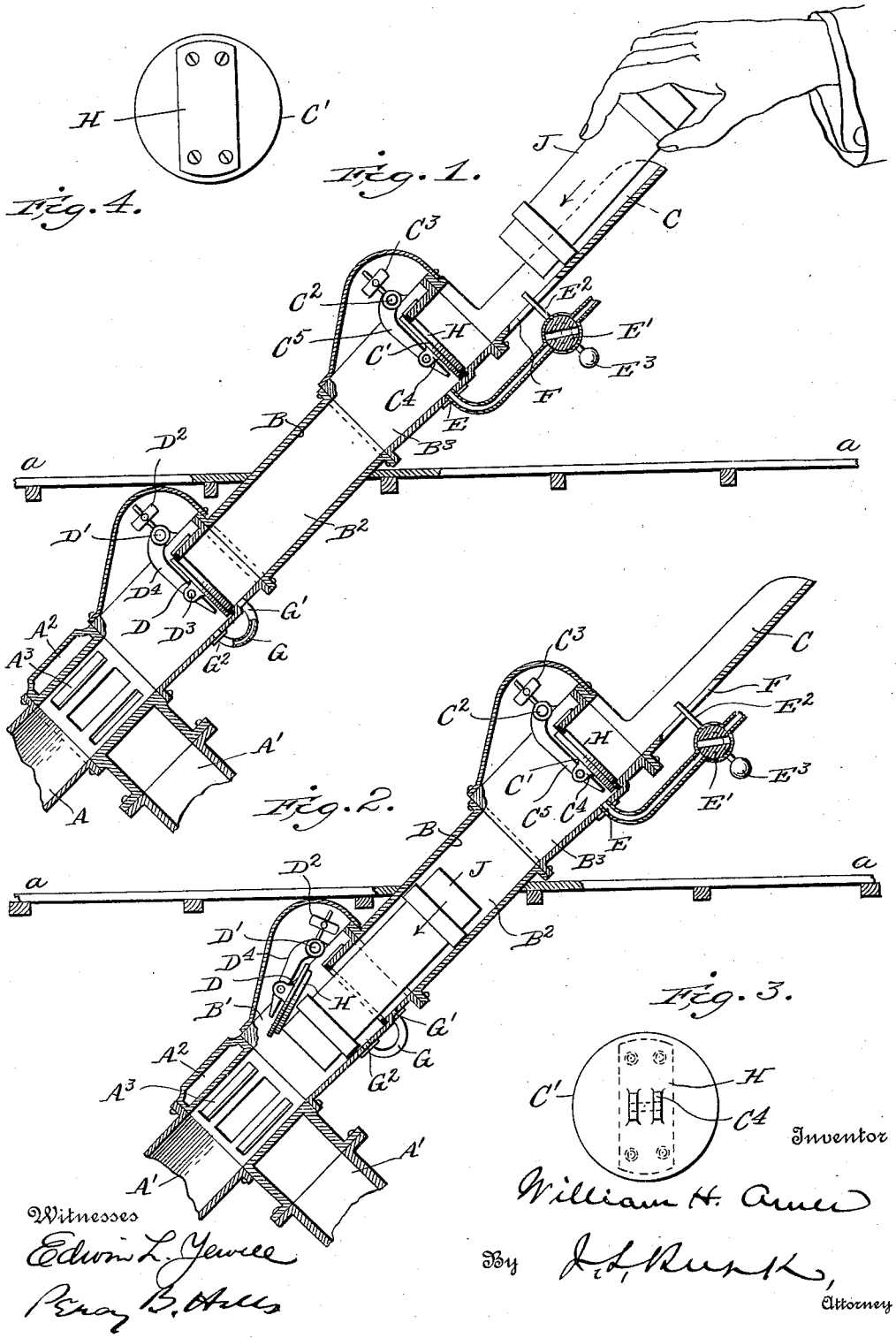

WILLIAM H. AMES, OF EASTON, MASSACHUSETTS, ASSIGNOR TO AMERICAN PNEUMATIC SERVICE COMPANY, OF DOVER, DELAWARE, A CORPORATION OF DELAWARE.

VALVE FOR PNEUMATIC-DESPATCH-TUBE APPARATUS.

1,052,554.     Specification of Letters Patent.     Patented Feb. 11, 1913.

Application filed August 26, 1908. Serial No. 450,316.

*To all whom it may concern:*

Be it known that I, WILLIAM H. AMES, of Easton, in the county of Bristol and State of Massachusetts, have invented certain new and useful Improvements in Valves for Pneumatic-Despatch-Tube Apparatus, of which the following is a specification.

My invention relates to improvements in valves for pneumatic despatch tube apparatus, and especially to the valve mechanism used in a sending terminal through which carriers are inserted into the transmission tube.

It has for its object the provision of means whereby the valve plates are provided with a reinforcing strip or rib to take up the wear and prevent the wear from coming on the valve plate.

In the accompanying drawings, which illustrate a sending terminal in which my improved valve mechanism is employed, Figure 1 is a sectional view of the sending terminal showing a carrier about to be inserted therein for transmission. Fig. 2 is a similar view showing the carrier passing the inner valve gate. Fig. 3 is an under plan view of the valve gate. Fig. 4 is a top plan view of the valve gate, showing the wear plate with which the gate is equipped.

Like reference characters designate corresponding parts in the several views.

Referring to the drawings, the transmission tube A is in communication with the air-supply pipe A' through the intermediate casing $A^2$ provided with the slots $A^3$. Secured to the slotted casing is the cylinder B comprising the chambers B', $B^2$ and $B^3$, connected together and communicating with each other to form a continuation of the transmission tube A beyond the casing $A^2$. Secured to the upper or outer end of the chamber $B^3$ is the chute C to facilitate the introduction of carriers into said chamber. Inside of the upper end of the chamber $B^3$ is located the valve or gate C' adapted to close against a seat on the interior face of the chamber. On the outer face of the valve C' is the metal wear-plate H, the two being secured together by screws as shown in Figs. 3 and 4. Projecting from the back of the wear-plate H are the lugs $C^4$ extending through the valve C', and between these lugs, back of the valve, is pivoted the lever $C^5$ hinged at $C^2$ to the wall of the chamber $B^3$. On the lever $C^5$ is the counterweight $C^3$ to balance the valve C' and its connections and operating to normally close the valve.

In the upper part of the chamber B' is a valve mechanism identical with that in the upper part of the chamber $B^3$. The mechanism in the chamber B' comprises the valve D having on its upper face the metal wear-plate H. From the back of the wear-plate project the lugs $D^3$ through the valve and have pivoted between them the lever $D^4$ hinged at D' to the wall of the chamber. On the lever $D^4$ is the counterweight $D^2$ normally operating to hold the valve D closed against its seat on the interior wall of the chamber.

The two gates or valves C' and D act as an air-lock for the cylinder B, and in operation only one valve is open at a time and normally both are closed. The tube G, communicating with the cylinder B at the points G' and $G^2$, forms a by-pass around the valve D so that the air-pressure from the tube A can pass into the chamber between the valves C' and D when the valve D is closed to normally keep the valve C' closed tightly against its seat.

The port E to the outside air communicates with the interior of the cylinder B just inside of the seat for the valve C', and is provided with a controlling valve E'. On this valve is the arm $E^2$ provided with a counterweight $E^3$. The counterweight through the arm normally holds the valve E' closed with the arm projecting through the opening F in the chute C. When the valve E' is opened the pressure in the cylinder B between the valves C' and D is spilled through the port E to the outside air.

J represents the carrier, and *a, a,* is the floor-line.

The operation is as follows: A carrier J is placed upon the chute C as shown in Fig. 1 so that it will slide into the cylinder B. In sliding down the chute the carrier engages the arm $E^2$ and thereby turns the valve E' to open the port E to spill to the outside air the pressure in the cylinder B between the valves C' and D. This removes the pressure from the under side of the valve C' and permits the carrier by its own weight to open said valve and to slide into the cylinder B against the valve D, the latter being held closed by the air-pressure on its under side. After the carrier passes the arm E² the counterweight E³ turns the valve E' to close the port E. After the carrier passes the valve C', the latter by the action of the counterweight C³ closes. With both valves C' and D closed and the carrier resting against the valve D, the air-pressure from the tube A passes through the by-pass G to equalize the pressure on both sides of the valve D. When this happens the carrier by its own weight opens the valve D, as shown in Fig. 2, and passes into the tube A to be transmitted by the pressure from the air-supply pipe A'. Immediately after the carrier passes the valve D, the latter is closed by the counterweight D² and the apparatus is ready for the transmission of another carrier.

The metallic wear-plates H on the outer faces of the valves C' and D receive the carriers entering the apparatus and prevent wear of the valves. It is to be observed that the metal wear-plates H are not secured to the faces of the valves C' and D so that the valves will take up the shock of the striking carriers. For an instance, in the upper valve mechanism, of which the part C' forms the valve proper, on the back of the wear plate H are the lugs C⁴ passing through the valve C' and between which is pivoted the end of the lever C⁵ back of the valve, thereby forming a direct connection between the plate H and the lever C⁵ through the valve C'. By this construction the valve C' is not only held in operative position by the lever C⁵, but is also protected against injury by the metal wear-plate H on its face. The impact of the carrier striking the upper valve mechanism is not directly received by the valve C', but the shock of the blow is taken up by the wear-plate H, which imparts it to the lever C⁵ through the lugs C⁴. In this way the valve C', which may be made of any suitable material, is not subjected to the wearing of entering carriers to its detriment and its tight fit to its seat is not impaired. The metal plate H is approximately rectangular in the embodiment illustrated, and of a length less than the diameter of the valve. This leaves the circumferential or marginal portion of the valve C' free to perform its function of closely engaging its seat.

Having thus described my invention, what I claim and desire to secure by Letters Patent is,

1. In pneumatic despatch tube apparatus, valve mechanism operated by the impact of a carrier comprising a valve, a seat for the valve, a hinged lever, a protecting plate on the face of the valve to receive the impact of a carrier, and a pivotal connection extending through the valve between the protecting plate and the lever to transmit the shock of the striking carrier from the protecting plate through the valve to the lever.

2. In pneumatic despatch tube apparatus, valve mechanism operated by the impact of a carrier comprising a valve, a seat for the valve, a hinged lever, a protecting plate on the face of the valve to receive the impact of the carrier, and a lug on the protecting plate extending through the valve and pivoted to the lever to transmit the shock of the striking carrier from the protecting plate through the valve to the lever.

In testimony whereof, I have signed my name to this specification in the presence of two subscribing witnesses, this 19th day of August, A. D. 1908.

WILLIAM H. AMES.

Witnesses:
   M. L. EMERSON,
   S. B. DRANE.